US011430210B2

(12) United States Patent
Landry et al.

(10) Patent No.: US 11,430,210 B2
(45) Date of Patent: Aug. 30, 2022

(54) METHODS AND SYSTEM FOR ESTIMATION OF LAMBERTIAN EQUIVALENT REFLECTANCE FOR REFLECTIVE BAND IMAGERY

(71) Applicant: Raytheon Company, Waltham, MA (US)

(72) Inventors: Joseph C. Landry, Dallas, TX (US); Thomas J. Grabow, Richardson, TX (US)

(73) Assignee: Raytheon Company, Waltham, MA (US)

( * ) Notice: Subject to any disclaimer, the term of this patent is extended or adjusted under 35 U.S.C. 154(b) by 252 days.

(21) Appl. No.: 16/905,380

(22) Filed: Jun. 18, 2020

(65) Prior Publication Data

US 2021/0397810 A1   Dec. 23, 2021

(51) Int. Cl.
| | |
|---|---|
| *G06V 20/13* | (2022.01) |
| *G06V 20/10* | (2022.01) |
| *G06V 10/36* | (2022.01) |
| *G06V 10/60* | (2022.01) |
| *G01J 3/28* | (2006.01) |
| *G01J 3/42* | (2006.01) |
| *G06T 5/00* | (2006.01) |
| *G06T 5/20* | (2006.01) |

(52) U.S. Cl.
CPC ............ *G06V 20/13* (2022.01); *G01J 3/2823* (2013.01); *G06T 5/003* (2013.01); *G06T 5/20* (2013.01); *G06V 10/36* (2022.01); *G06V 10/60* (2022.01); *G01J 2003/2826* (2013.01); *G06V 20/194* (2022.01)

(58) Field of Classification Search
None
See application file for complete search history.

(56) References Cited

U.S. PATENT DOCUMENTS

| | | | | |
|---|---|---|---|---|
| 8,073,279 | B2* | 12/2011 | Riley | G06V 20/13 |
| | | | | 382/254 |
| 8,558,884 | B2* | 10/2013 | Ingram, Jr | G01N 15/06 |
| | | | | 348/135 |
| 2014/0270332 | A1* | 9/2014 | Pacifici | G06T 5/001 |
| | | | | 382/100 |
| 2020/0043136 | A1* | 2/2020 | Nagare | G06T 7/90 |
| 2020/0082151 | A1* | 3/2020 | Huang | G06T 5/50 |

FOREIGN PATENT DOCUMENTS

| | | | | | |
|---|---|---|---|---|---|
| CN | | 106290090 | A | * | 1/2017 |
| CN | | 110163035 | A | * | 8/2019 |
| CN | | 111006761 | A | * | 4/2020 |
| CN | | 111402162 | A | * | 7/2020 |
| WO | WO-2010115228 | A1 | * | 10/2010 | G06T 5/003 |

* cited by examiner

*Primary Examiner* — Mohammed Rachedine
(74) *Attorney, Agent, or Firm* — Schwegman Lundberg & Woessner, P.A.

(57) ABSTRACT

A system for estimating a Lambertian equivalent reflectance for reflective band imagery is disclosed. In some embodiments, the system estimates an equivalent reflectance and performs atmospheric correction of reflective band imagery without user interaction and accounts for the effect of background reflectance mixing with individual target reflectances. Some of these embodiments use a dark pixel-based technique to improve the characterization of the atmosphere.

20 Claims, 4 Drawing Sheets

METHODS AND SYSTEM FOR ESTIMATION OF LAMBERTIAN EQUIVALENT REFLECTANCE FOR REFLECTIVE BAND IMAGERY

GOVERNMENT RIGHTS

This invention was made with Government support under Contract Number HM047617D0015/HM047617F0365. The Government has certain rights in this invention.

TECHNICAL FIELD

Embodiments pertain to Reflective Band Imagery. Some embodiments relate to estimating a Lambertian equivalent reflectance for reflective band imagery.

BACKGROUND

Exploiters of reflective band imagery are usually interested in surface properties and uninterested in the atmosphere between the imager and the surface. Removing the atmospheric effects is important for exploitation. However, many atmospheric removal techniques require a user to have a-priori knowledge of some targets in the scene, which is often unrealistic. Thus, what is needed is a technique for estimation of an equivalent reflectance that performs atmospheric correction of reflective band imagery without user interaction and accounts for the effect of background reflectance mixing with individual target reflectances.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Embodiments disclosed herein provide methods and systems for estimating a Lambertian equivalent reflectance for reflective band imagery. In some embodiments, a system may estimate an equivalent reflectance and performs atmospheric correction of reflective band imagery without user interaction and accounts for the effect of background reflectance mixing with individual target reflectances. Some of these embodiments use a dark pixel-based technique to improve the characterization of the atmosphere. The technique builds atmospheric correction terms and applies them to a smeared version of the input image to estimate background reflectance throughout the scene and then applies the correction terms to individual pixel values, considering the background reflectance, to produce individual pixel reflectances. These embodiments are described in more detail below.

Characterization of aerosol properties is one of the more difficult parts of atmospherically correcting overhead reflective band imagery to produce surface properties. Reliance on a priori climatological models can result in unrealistic surface reflectance estimates. Requiring the user to designate areas of known reflectance in a scene is cumbersome and assumes user knowledge, which is often unrealistic. Some embodiments disclosed herein use available weather data for the image and update the aerosol parameters based on the weather data. In some embodiments, a histogram of pixel values for each spectral band may be formed and the lowest intensity pixels may be identified as dark pixels. In these embodiments, the identified pixels may be assumed to have low reflectance. In some of these embodiments, the system may then simultaneously solve for the aerosol optical depth and the background reflectance of dark pixels that give the measured radiance of the dark pixels. In these embodiments, a physics-based model may be applied to automatically estimate the aerosol optical depth in a reflective band scene without user interaction. These embodiments are described in more detail below.

Figure 1:
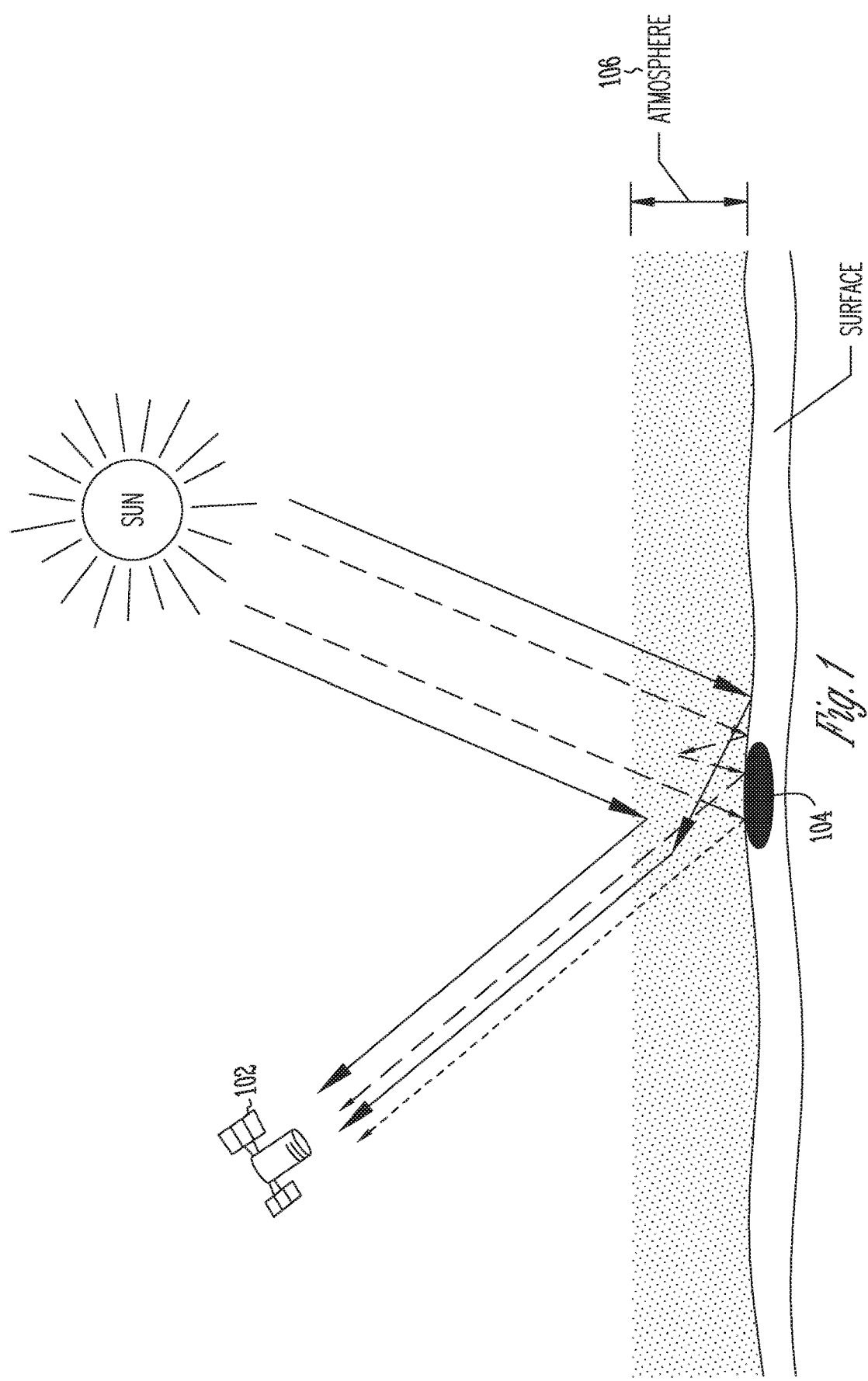
FIG. 1 illustrates multi-spectral image generation in an atmosphere with aerosols in accordance with some embodiments.

FIG. 1 illustrates multi-spectral image generation in an atmosphere with aerosols in accordance with some embodiments. Overhead imaging device 102 may acquire multi-spectral data through scattering atmosphere 106 for use in generating a multi-spectral image. In a scatter-free atmosphere, the measured radiance depends only on direct transmission to and from the target, and on the target reflectance. In an atmosphere with aerosols (as illustrated in FIG. 1), the measured radiance depends on target reflectance, background reflectance, and aerosol scattering. Estimating surface properties when imaging through a scattering atmosphere is much harder. Embodiments disclosed herein look at one or more dark pixels which may be associated with a dark or shadowed region 104) to characterize the atmosphere 106 to generate an improved estimate of the aerosol optical depth. These embodiments, including the use of dark pixels, are described in more detail below.

Figure 2:
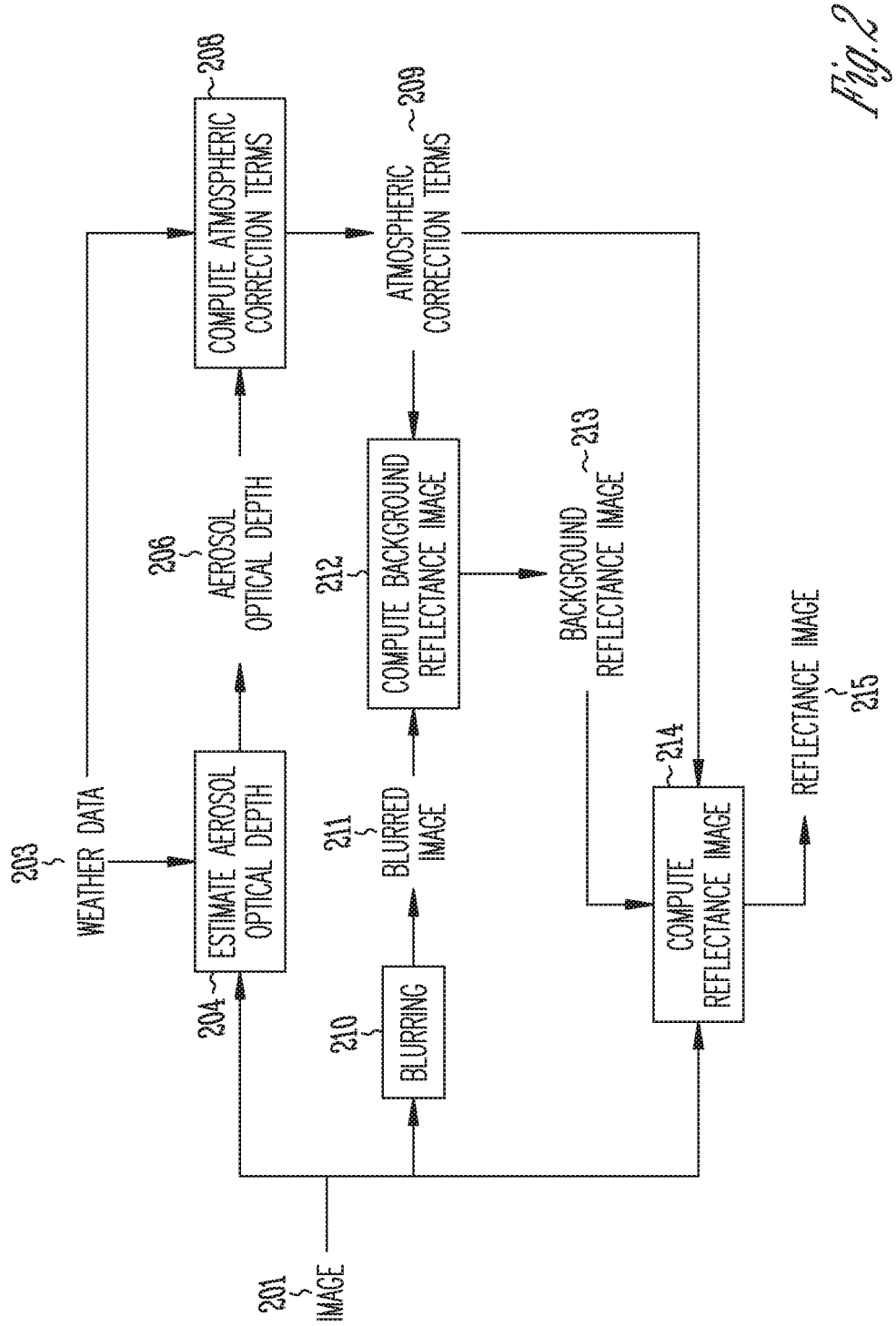
FIG. 2 illustrates a system for generating a reflectance image in accordance with some embodiments.

FIG. 2 illustrates a system for generating a reflectance image in accordance with some embodiments. In accordance with embodiments, the system may be configured to generate a reflectance image 215 from a multi-spectral image 201. The multi-spectral image 201 may comprise a plurality of spectral bands and may be generated based on spectral data collected by an overhead imaging device, such as overhead imaging device 102 (FIG. 1). In these embodiments, the system may comprise processing circuitry and memory. The operations performed by the processing circuitry are illustrated in FIG. 2.

In accordance with some embodiments, an aerosol optical depth (AOD) 206 may be estimated in operation 204 for each spectral band of the multi-spectral image 201 based on weather data 203 and the multi-spectral image 201. One example way of estimating AOD 206 is discussed below in connection with FIG. 3. In these embodiments, atmospheric correction terms 209 may be computed in operation 208 for each spectral band based on the estimated AODs 206 and the weather data 203. In some embodiments, operation 208 may use an atmospheric correction tool such as Fast Line-of-sight Atmospheric Analysis of Spectral Hypercubes (FLAASH) or an 6S model, although other atmospheric correction tools and models may also be suitable. In these embodiments, blurring may be performed in operation 210 on the multi-spectral image 201 to generate a blurred image 211 and a background reflectance image 213 may be computed in operation 212 by applying the atmospheric correction terms 209 to the blurred image 211.

In some embodiments, a reflectance image 215 may be computed or generated in operation 214 by applying the atmospheric correction terms 209 to the multi-spectral image 201 and by removal of background effects from the multi-spectral image 201 by application of the background reflectance image 213 to the multi-spectral image 201. In these embodiments, atmospheric effects are removed from the multi-spectral image 201 and the desired surface effects (i.e., the surface reflectance) are retained. In some embodiments, the reflectance image 215, once computed, may be stored in memory. In some embodiments, the reflectance image 215 may be provided as an output or may be displayed on a display.

In these embodiments, the reflectance image 215 may comprise a set of pixels having values corresponding to a set of horizontal Lambertian reflectors on a surface (e.g., the ground) that would produce the multi-spectral image 201. In other words, the reflectance image 215 is a set of pixels whose values are the reflectances that a corresponding set of horizontal Lambertian reflectors on the ground would need to have in order to produce the original multi-spectral image 201. In these embodiments, the Lambertian equivalent reflectance image may have a Lambertian reflectance of the horizontal ground that would produce the input image (i.e., multi-spectral image 201), although the scope of the embodiments is not limited in this respect. In various embodiments, the generated reflectance image 215 may be output to a user and/or analyst via a display device for analysis and use. In some embodiments, the reflectance image 215 may be used to identify the material and/or material state of an object in the reflectance image 215. For example, the reflectance image 215 may be used to identify the material of a target object (e.g., healthy vegetation or asphalt), and based on the material identification, the target itself or target type (e.g., tree or paved road).

Figure 3:
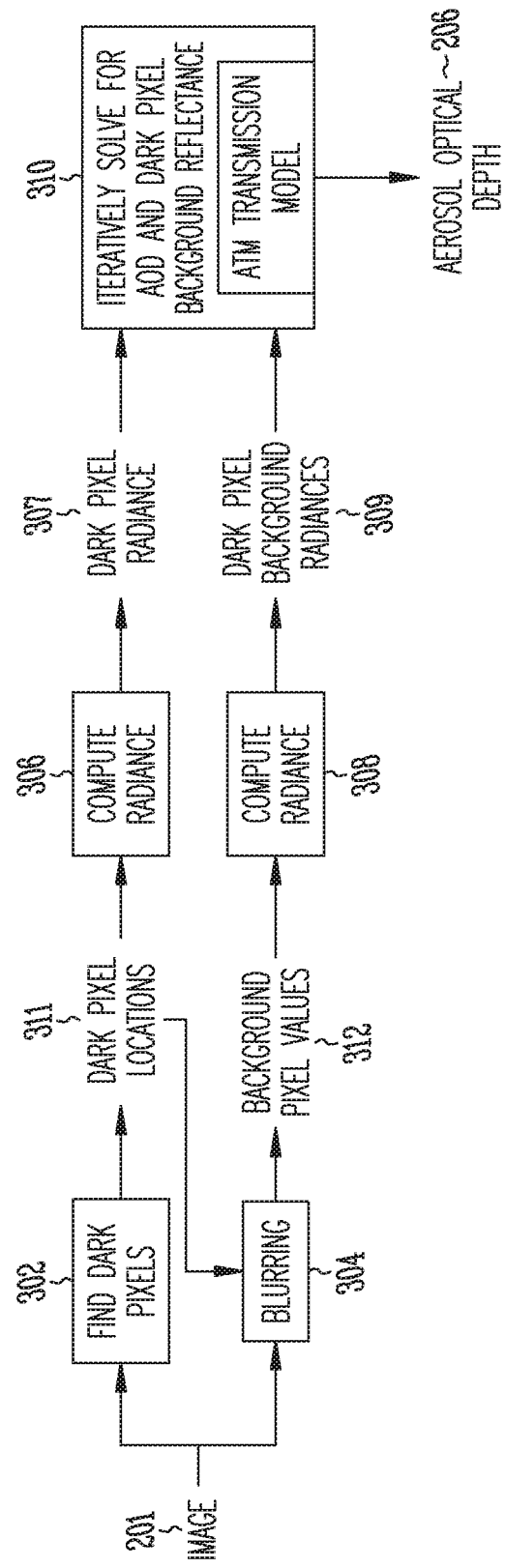
FIG. 3 illustrates a process for generating an aerosol optical depth (AOD) in accordance with some embodiments.

FIG. 3 illustrates a process for generating an aerosol optical depth in accordance with some embodiments. In these embodiments, the operations illustrated in FIG. 3 may be used to estimate an AOD 206 (FIG. 2) as part of operation 204 (FIG. 2), although other processes may be used. In accordance with these embodiments, dark pixels locations 311 may be identified in operation 302 in the multi-spectral image 201. In some embodiments, dark pixels may be identified based on a threshold which may be based on a proportion of pixels by value. For example, a histogram may be built from all of the pixel values and dark pixels may be identified having values below a threshold (e.g., 0.1% of the pixel values). The pixel closest to the center of the image that exists under that threshold may be identified. In these embodiments, in operation 304, blurring may be performed on areas of multi-spectral image 201 near the dark pixel locations 311 to obtain dark pixel background pixel values 312. In these embodiments, a dark pixel radiance value 307 may be determined in operation 306 for each spectral band based on the identified dark pixel locations 311. In these embodiments, a dark pixel background radiance value 309 may be determined in operation 308 for each spectral band based on the dark pixel background pixel values 312. In these embodiments, operation 310 may comprise iteratively solving for the AOD 206 and a dark pixel background reflectance for each spectral band using the dark pixel radiance value 307 for each spectral band and the dark pixel background radiance value 309 for each spectral band.

In some embodiments, the AOD 206 and the dark pixel background reflectance are iteratively solved 310 for using an atmospheric transmission model and the weather data 203. In some embodiments, atmospheric radiative transfer modeling software such as MODTRAN (MODerate resolution atmospheric TRANsmission) may be used, although the scope of the embodiments is not limited in this respect. In these embodiments, the effects of the dark pixel background reflectance are removed from dark pixel radiance 307 in order to infer aerosol optical depth. Since the dark pixel radiance depends on aerosol optical depth and background reflectance, once the background reflectance is estimated, some low reflectance value for the dark pixel may be assumed and the aerosol optical depth can be inferred. In these embodiments, the AOD 206 generated by operation 310 may be an improved AOD for the weather data 203.

In some embodiments, to perform the blurring 304 on areas of multi-spectral image 201 near the dark pixel locations 311 to obtain dark pixel background pixel values 312, for a particular pixel the processing circuitry may average over all the pixels within a number of rows and a number of columns of the pixel. In some embodiments, for example, for a particular pixel the processing circuitry may average over all the pixels within approximately fifty rows and approximately fifty columns of the pixel, although the scope of the embodiments is not limited in this respect.

In some embodiments, the weather data 203 (FIG. 2) may comprise weather data associated with a time and location of the multi-spectral image and comprises at least pressure as a function of altitude, water vapor as a function of the altitude and aerosol types that are present. In some embodiments, the weather data 203 may be obtained from the Air Force Weather Agency (AFWA), although this is not a requirement as other sources of weather data may be used. In some embodiments, the weather data 203 provided by the AFWA may also include an AOD estimate, however this AOD estimate may not be accurate enough for operation 208. Accordingly, the AOD 206 generated by operation 204 may be an improved AOD.

In some embodiments, the multi-spectral image 201 is generated by overhead (e.g., satellite) imaging. In some other embodiments, the multi-spectral image 201 may be generated by other imaging systems and/or sensors which may be mounted on an aircraft (manned or unmanned) or another platform. In some embodiments, the spectral bands comprise shortwave Infrared (SWIR) bands, near infrared (NIR) bands, and visible-light bands. In some of these embodiments, the SWIR bands comprise wavelengths in the 1000 and 2500 nanometer (nm) range, NIR bands comprise wavelengths in the 700 and 1000 nm range, and the visible-light bands comprise wavelengths in the 400 to 700 nm range. In some embodiments, up to eight SWIR bands may be used and up to eight NIR and visible light bands may be used, although the scope of the embodiments is not limited in this respect as a greater number or lesser number of bands may be used.

In some embodiments, since atmospheric aerosols have a greater effect on shorter wavelengths, primarily in the visible range, and have a lesser impact on the SWIR bands which have longer wavelengths, an improved aerosol optical depth (i.e., AOD 206) does not need to be estimated when the multi-spectral image comprises primarily SWIR bands. In this situation, the AOD provided with the weather data 203 may be used, for example.

In some embodiments, the multi-spectral image 201 may be a high-resolution image having a resolution of approximately two meters or less although the scope of the embodiments is not limited in this respect. In some embodiments, the resolution needed may be based on the ability to reliably identify dark pixels, which may typically be shadowed regions of the image.

In some embodiments, multi-spectral image 201 may be a hyperspectral image comprising hundreds of spectral bands. In these embodiments, hyperspectral imagery, with hundreds of bands may be used and processed. In these hyperspectral imagery embodiments, band averaging may be performed to reduce the number of hyperspectral bands that need to be processed and an interpolation process may be used to generate the AOD for hyperspectral bands that were not processed, although the scope of the embodiment is not limited in this respect.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Figure 4:
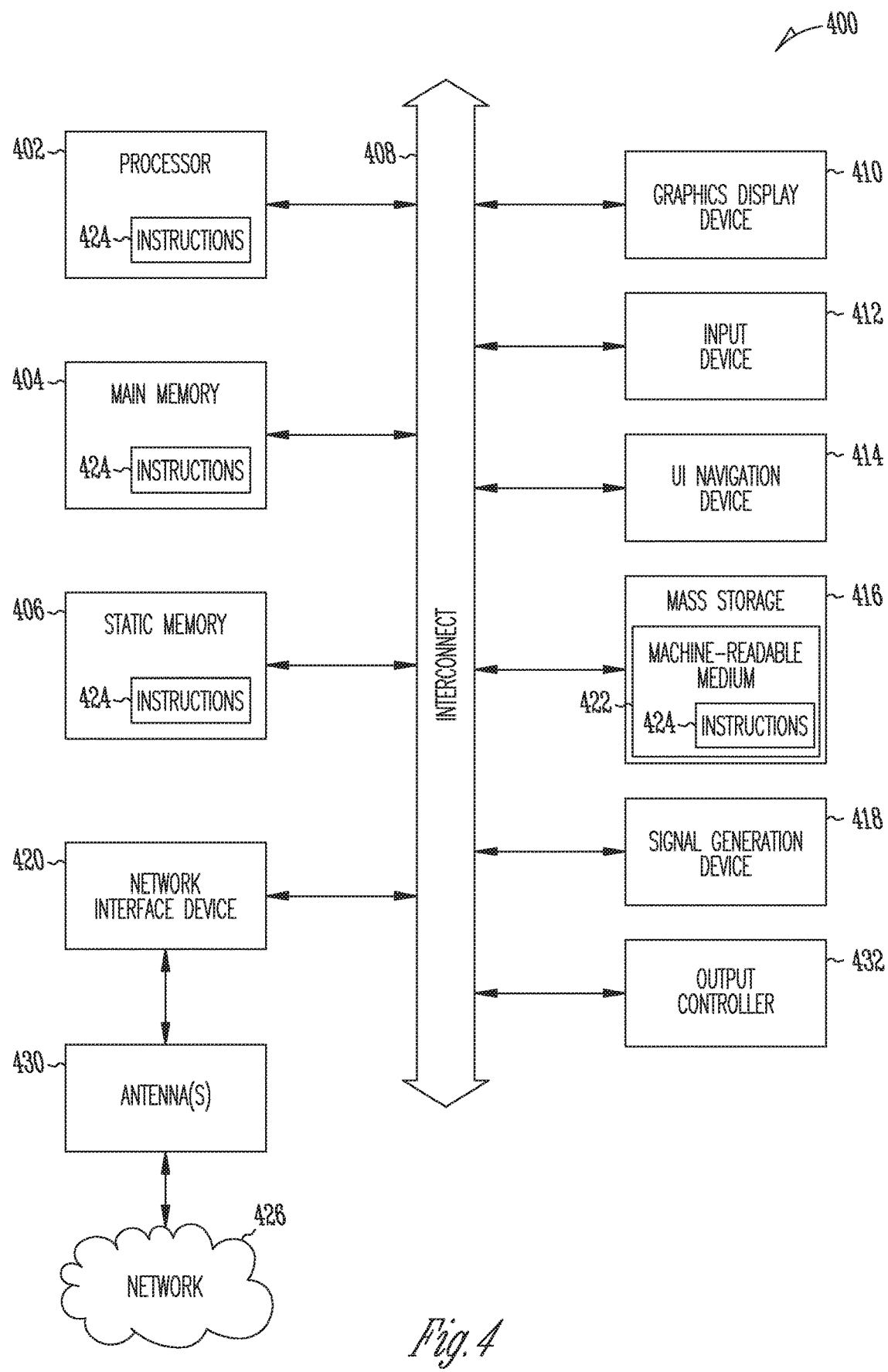
FIG. 4 illustrates a block diagram of processing system in accordance with some embodiments.

FIG. 4 illustrates a block diagram of an example processing system 400 upon which any one or more of the techniques (e.g., methodologies) discussed herein may perform. Processing system 400 may be configured to generate a reflectance surface as described here. In alternative embodiments, the processing system 400 may operate as a stand-alone device or may be connected (e.g., networked) to other machines. In a networked deployment, the processing system 400 may operate in the capacity of a server machine, a client machine, or both in server-client network environments. In an example, the processing system 400 may act as a peer machine in peer-to-peer (P2P) (or other distributed) network environment. The processing system 400 may be a processing system, a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Processing system 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The processing system 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The processing system 400 may additionally include a storage device (e.g., drive unit) 416, a signal generation device 418 (e.g., a speaker), a network interface device 420, and one or more sensors, such as a global positioning system (GPS) sensor, compass, accelerometer, or other sensor. The processing system 400 may include an output controller 432, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine-readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the processing system 400. In an example, one or any combination of the hardware processor 402, the main memory 404, the static memory 406, or the storage device 416 may constitute machine-readable media.

While the machine-readable medium 422 is illustrated as a single medium, the term "machine-readable medium" may include a single medium or multiple media (e.g., a centralized or distributed database, and/or associated caches and servers) configured to store the one or more instructions 424.

The term "machine-readable medium" may include any medium that is capable of storing, encoding, or carrying instructions for execution by the processing system 400 and that cause the processing system 400 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine-readable media may include non-transitory machine-readable media. In some examples, machine-readable media may include machine-readable media that is not a transitory propagating signal. The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). In some embodiments, device 400 may include one or more antennas 430.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A system configured to generate a reflectance image from a multi-spectral image, the multi-spectral image comprising a plurality of spectral bands, the system comprising: processing circuitry; and memory, wherein the processing circuitry is configured to:
    estimate an aerosol optical depth (AOD) for each spectral band of the multi-spectral image based on weather data and the multi-spectral image;
    compute atmospheric correction terms for each spectral band based on the estimated AODs and the weather data;
    perform blurring on the multi-spectral image to generate a blurred image;
    compute a background reflectance image by applying the atmospheric correction terms to the blurred image;
    compute the reflectance image by applying the atmospheric correction terms to the multi-spectral image and by removal of background effects from the multi-spectral image by application of the background reflectance image to the multi-spectral image; and
    store the reflectance image in the memory.

2. The system of claim 1, wherein the reflectance image comprises a set of pixels having values corresponding to a set of Lambertian reflectors.

3. The system of claim 2, wherein to estimate the AOD, the processing circuitry is configured to:
    identify dark pixels locations in the multi-spectral image;
    perform blurring on areas of multi-spectral image near the dark pixel locations to obtain dark pixel background pixel values;
    determine a dark pixel radiance value for each spectral band based on the identified dark pixel locations;
    determine a dark pixel background radiance value for each spectral band based on the dark pixel background pixel values; and
    iteratively solve for the AOD and a dark pixel background reflectance for each spectral band using the dark pixel radiance value for each spectral band and the dark pixel background radiance value for each spectral band.

4. The system of claim 3, wherein the AOD and the dark pixel background reflectance are iteratively solved for using an atmospheric transmission model and the weather data.

5. The system of claim 4, wherein the weather data comprises weather data associated with a time and location of the multi-spectral image and comprises at least pressure as a function of altitude, water vapor as a function of the altitude and aerosol types that are present.

6. The system of claim 5, wherein the multi-spectral image is generated by overhead imaging data, and wherein the spectral bands comprise shortwave Infrared (SWIR) bands, near infrared (NIR) bands, and visible-light bands.

7. The system of claim 6, wherein the multi-spectral image is a high-resolution image having a resolution of approximately two meters or less.

8. The system of claim 1, wherein the multi-spectral image is a hyperspectral image comprising hundreds of spectral bands.

9. The system of claim 1, wherein the processing circuitry is further configured to:
    identify, based on the reflectance image, a material and/or material state of an object in the reflectance image; and
    identify, based on the identified material and/or material state, the object or object type.

10. The system of claim 9, wherein the memory is configured to store the weather data.

11. A non-transitory computer-readable storage medium that stores instructions for execution by processing circuitry, the instructions to configure the processing circuitry for generation of a reflectance image from a multi-spectral image, the multi-spectral image comprising a plurality of spectral bands, wherein to generate the reflectance image, the processing circuitry is configured to:
    estimate an aerosol optical depth (AOD) for each spectral band of the multi-spectral image based on weather data and the multi-spectral image;
    compute atmospheric correction terms for each spectral band based on the estimated AODs and the weather data;
    perform blurring on the multi-spectral image to generate a blurred image;
    compute a background reflectance image by applying the atmospheric correction terms to the blurred image; and
    generate a reflectance image by applying the atmospheric correction terms to the multi-spectral image and by removal of background effects from the multi-spectral image by application of the background reflectance image to the multi-spectral image.

12. The non-transitory computer-readable storage medium of claim 11, wherein the reflectance image comprises a set of pixels having values corresponding to a set of Lambertian reflectors.

13. The non-transitory computer-readable storage medium of claim 12, wherein to estimate the AOD, the processing circuitry is configured to:
    identify dark pixels locations in the multi-spectral image;
    perform blurring on areas of multi-spectral image near the dark pixel locations to obtain dark pixel background pixel values;
    determine a dark pixel radiance value for each spectral band based on the identified dark pixel locations;
    determine a dark pixel background radiance value for each spectral band based on the dark pixel background pixel values; and iteratively solve for the AOD and a dark pixel background reflectance for each spectral band using the dark pixel radiance value for each spectral band and the dark pixel background radiance value for each spectral band.

14. The non-transitory computer-readable storage medium of claim 13, wherein the AOD and the dark pixel background reflectance are iteratively solved for using an atmospheric transmission model and the weather data.

15. The non-transitory computer-readable storage medium of claim 14, wherein the weather data comprises weather data associated with a time and location of the multi-spectral image and comprises at least pressure as a function of altitude, water vapor as a function of the altitude and aerosol types that are present.

16. The non-transitory computer-readable storage medium of claim 15, wherein the multi-spectral image is generated by overhead imaging data, and wherein the spectral bands comprise shortwave Infrared (SWIR) bands, near infrared (NIR) bands, and visible-light bands.

17. The non-transitory computer-readable storage medium of claim 16, wherein the multi-spectral image is a high-resolution image having a resolution of approximately two meters or less.

18. A method for generating a reflectance image from a multi-spectral image, the multi-spectral image comprising a plurality of spectral bands, wherein to generate the reflectance image, the method comprises:
   estimating an aerosol optical depth (AOD) for each spectral band of the multi-spectral image based on weather data and the multi-spectral image data;
   computing atmospheric correction terms for each spectral band based on the estimated AODs and the weather data;
   performing blurring on the multi-spectral image to generate a blurred image;
   compute a background reflectance image by applying the atmospheric correction terms to the blurred image; and
   generating a reflectance image by applying the atmospheric correction terms to the multi-spectral image and by removal of background effects from the multi-spectral image by application of the background reflectance image to the multi-spectral image.

19. The method of claim 18, wherein the reflectance image comprises a set of pixels having values corresponding to a set of Lambertian reflectors.

20. The method of claim 19, wherein estimating the AOD comprises:
   identifying dark pixels locations in the multi-spectral image;
   performing blurring on areas of multi-spectral image near the dark pixel locations to obtain dark pixel background pixel values;
   determining a dark pixel radiance value for each spectral band based on the identified dark pixel locations;
   determining a dark pixel background radiance value for each spectral band based on the dark pixel background pixel values; and
   iteratively solving for the AOD and a dark pixel background reflectance for each spectral band using the dark pixel radiance value for each spectral band and the dark pixel background radiance value for each spectral band.

* * * * *